United States Patent

[11] 3,622,506

| [72] | Inventor | Armand J. de Rosset<br>Clarendon Hills, Ill. |
|---|---|---|
| [21] | Appl. No. | 837,315 |
| [22] | Filed | June 27, 1969 |
| [45] | Patented | Nov. 23, 1971 |
| [73] | Assignee | Universal Oil Products Company<br>Des Plaines, Ill.<br>Continuation-in-part of application Ser. No. 710,786, Mar. 6, 1968, now abandoned, which is a continuation-in-part of application Ser. No. 449,282, Apr. 19, 1965, now abandoned. This application June 27, 1969, Ser. No. 837,315 |

[54] REGENERATION OF CRYSTALLINE ALUMINOSILICATES
9 Claims, No Drawings

| [52] | U.S. Cl. | 208/310,<br>260/676 MS, 252/420 |
|---|---|---|
| [51] | Int. Cl. | C07c 7/12 |
| [50] | Field of Search | 252/420;<br>208/310; 260/676 MS |

[56] References Cited
UNITED STATES PATENTS

| 2,908,639 | 10/1959 | Carter et al. | 208/310 |
|---|---|---|---|
| 3,075,023 | 1/1963 | Garrison et al. | 252/420 |
| 3,330,778 | 7/1967 | Irvin | 252/420 |
| 3,420,772 | 1/1969 | Eck et al. | 252/420 |
| 3,422,004 | 1/1969 | Padrta | 252/420 |
| 3,437,601 | 4/1969 | Skala et al. | 252/420 |

Primary Examiner—Herbert Levine
Attorneys—James R. Hoatson, Jr. and Robert W. Erickson ABSTRACT: A method for effecting the regeneration of crystalline aluminosilicates which have become deactivated in an adsorption process as a result of the retention therein of high molecular weight polar organic contaminants. Conditions of temperature and pressure are controlled such that regeneration is effected in a liquid-phase system. A mixed liquid regenerant of water and an organic solvent having molecular dimensions such that said organic solvent is not adsorbed within the pores of the adsorbent is employed. The flow rate of the liquid regenerant is controlled to maintain the contacting temperature below a level of about 150° C.

REGENERATION OF CRYSTALLINE ALUMINOSILICATES

CROSS-REFERENCES TO RELATED APPLICATIONS

The present application is a continuation-in-part of my copending application, Ser. No. 710,786, filed Mar. 6, 1968, which in turn is a continuation-in-part of application, Ser. No. 449,282, filed Apr. 19, 1965, both of said prior applications being now abandoned.

BACKGROUND OF THE INVENTION

1. Field of the Invention

The present invention encompasses a method for regenerating deactivated crystalline aluminosilicates. More specifically, the present invention relates to a solvent contact regeneration process which employs a particularly selected regenerant material which removes contaminants deposited on the aluminosilicate, thereby restoring the adsorptive capacity and mass transfer rate of adsorption and desorption of the sorbent.

2. Description of the Prior Art

It must necessarily be recognized that the prior art, whether published literature, or issued patents, abounds with the various aspects of molecular sieve technology. Such art is replete with teachings directed toward zeolite compositions, uses of zeolites, both as such and as catalyst components, various methods for manufacturing molecular sieves of different types and characteristics, and schemes for effecting the regeneration, or reactivation, of zeolitic material. With respect to the latter, to which the present invention is directed, a perusal of the prior art appears to indicate that the selected regenerating technique is primarily dependent upon two considerations. One such consideration involves the particular service which the zeolitic material has experienced—i.e. adsorption, catalytic, etc.—and its composition, the latter generally being "-tailored" to fit the service. The other consideration concerns the cause and/or character of the deactivation, as well as the contaminating influence which precipitates the deactivation. No attempt will be made herein to delineate exhaustively this prior art; it will suffice, for the purpose of setting forth the present invention, to discuss briefly schemes which are exemplary of prior art regeneration techniques.

In U.S. Pat. No. 2,908,639, a zeolitic material employed in a cyclic adsorption-desorption process is deactivated by the presence of tarry material on the surface thereof. The tarry substance is a polymer product of various contaminating influences in the feed stream, and results from the relatively high temperatures utilized in the desorption cycle of the process. The regeneration technique described involves initially contacting the deactivated sorbent with an organic solvent, at its boiling point, to dissolve the tarry substance, thereby removing the same from the surface of the sorbent. When the tarry material is reduced to a level below about 1.5 percent by weight, refluxing of the solvent is discontinued and the sorbent heated to drive off residual solvent. There then follows an oxidation treatment at elevated temperature to oxidize the remaining material. The solvents utilized are those which have a critical molecular diameter larger than the pore diameter of the sorbent such that the solvent does not enter the pores, but remains on the surface to facilitate removal thereof by evaporation.

It is noteworthy that this process is unconcerned with any contaminating material which has entered into the pores of the sorbent, to be tenaciously retained therein to the exclusion of the component of the feed stream to be selectively sorbed. Where such contaminating material is in fact present within the pores of the sorbent, this regeneration technique is incapable of effecting the removal thereof, thereby returning the sorbent to near its initial sorptive activity. Significant also is the fact that the regeneration technique necessitate an oxidation treatment at elevated temperatures up to 900° F. Observations have indicated that high molecular weight contaminants within the pores tend to crack and carbonize, while various polar organic compounds undergo condensation reactions which result in permanent damage to the sorbent. Furthermore, repeated oxidative treatments at such high temperature levels progressively attacks the structure of the zeolitic material.

A more recent U.S. Pat., Number 3,240,837, recognizes that "regeneration," when alluding to molecular sieve technology, is different from "desorption," the latter being an integral requirement of the adsorption process wherein the selectively sorbed components are desorbed from the sieve. While it is also recognized that sieve deactivation, resulting from "strongly" adsorbed material, can be effected through the use of a displacing agent—ammonia and $C_1$ to $C_5$ amines being suggested—the regeneration is conducted at temperatures up to a level of 1,000° F. As hereinabove stated, elevated temperatures of this order result in deleterious effects to the extent that the zeolitic material can experience severe, irreversible damage. Significantly, this particular regeneration scheme, in effect, is one of a multitude directed to conventional regeneration, employing for the purpose, a new group of inorganic solvents. Conspicuous by its absence is the recognition of water as the displacing agent, in admixture with a solvent used only to carry the polar organic contaminant out of the sieve bed following its displacement from the pores of the zeolitic material.

The invention described in U.S. Pat. No. 3,075,023, for reactivating zeolitic sorbents which have become deactivated by the accumulation of contaminating influences within the porous structure, involves a multiple-step process in which the sieves are first contacted with an inert purge stream containing a $C_3$ to $C_n$ normal paraffin in order to effect removal of the major portion of the adsorbed contaminant. The second step in this regeneration procedure involves passing a water-saturated purge stream through the sorbent for a time sufficient to rehydrate completely the zeolitic material. The hydrated sorbent is then heated, to a temperature 250° to 375° C. (482° to 70° F.) for the purpose of removing the water of hydration.

As hereinafter described in greater detail, the molecular sieve regeneration scheme, encompassed by my invention, restores sorptive selectivity, and especially the mass transfer of adsorption rate and desorption of a zeolitic material, deactivated by the retention of polar, organic compounds, in a unitary single-step process conducted in a liquid-phase operation. The process utilizes a mixed liquid regenerant which achieves the objectives of contaminant displacement from the sorbent bed, and of serving as a heat sink for the heat of adsorption. Furthermore, in accordance with the present method, there is no requirement for an oxidative treatment at excessively high temperature levels in order to restore the sorbent to near its initial activity.

Sorption-type processes, utilizing specific solid sorbents, for the separation of a variety of compounds on the basis of molecular structure and/or chemical composition, are well known and well defined in the applicable art. Such processes generally utilize an inorganic sorbent having pores in which one or more components of the mixture to be separated are selectively sorbed and retained within the pores; with respect to these pores, one or more components of the mixture, belonging to another class of compounds, are rejected. Sorbents having a certain degree of sorbency-selectivity are generally of the inorganic type such as certain specially activated carbons, for example those prepared by carbonization of acid sludges, specially activated alumina, and a class of zeolitic sorbents including certain metal aluminosilicates, particularly dehydrated alkaline metal and alkaline-earth metal crystalline aluminosilicates. These sorbents, upon dehydration, have pore entrances less than about 6 angstrom units in cross-sectional diameter, and a high sorbent capacity for polar molecules and straight-chain compounds, while rejecting branched-chain and cyclic compounds since the cross-sectional diameter of the pore entrances does not permit entry therein of compounds having larger molecular diameters than the straight-chain compounds.

In these processes, the crystalline aluminosilicate sorbate gradually becomes deactivated during a prolonged period of use, as a result of the sorption of polar organic compounds which appear as feed stock contaminants. These are retained by the sorbent with a greater degree of tenacity than that component of the feed stock being selectively sorbed. Thus, for example, when utilizing calcium aluminosilicate molecular sieves, having pore entrance diameters of about 5 angstrom units, for the separation of straight-chain hydrocarbons from their branched-chain isomers and cyclic analogs, the rate at which the sorbent is capable of sorbing the straight-chain components tends to decrease during use while the selectivity for a particular straight-chain component in comparison to another changes simultaneously. Analytical examination of the deactivated molecular sieve indicates that polar compounds, especially those of high molecular weight, are primarily responsible for the deactivation. These polar organic compounds generally consist of nitrogen-, oxygen- and sulfur-containing aliphatic hydrocarbons, polynuclear and heterocyclic compounds which, due to their electrophillic nature, are more susceptible to be retained by the sorbent with greater tenacity than the straight-chain components of the feed stock. Other such polar compounds include high molecular weight polycyclic aromatic hydrocarbons.

The pore structure of a molecular sieve consists of a series of interlaced cavities connected by smaller pore entrances. The latter are of uniform size, and effect the separation of compounds on the basis of molecular size. A number of pore entrances exist on the surface of the molecular sieve, and, when the polar contaminants are adsorbed at or near the surface pore entrance, the polar compounds can effectively block the passage of straight-chain compounds into and through the pore entrance. Accordingly, though there may be adequate volume within the internal cavities of the molecular sieve, the rate of sorption into the cavities becomes so slow that the molecular sieve is rendered incapable of practical separation of the straight-chain component from its mixture. It is evident that even a minor quantity of polar contaminants can effectively deactivate molecular sieves by strategically locating at these surface pore entrances. Notwithstanding that the concentration of polar contaminants within the feed stock may be reduced by pretreating steps including hydrorefining, adsorbent guard chambers, etc., a small quantity will invariably be introduced into the sorption zone, accumulate in and on the sieves, and eventually effect deactivation thereof. Although the sieves may be generated by burning in the presence of oxygen, such technique involves unloading the sieves from the sorption chamber. Furthermore, the oxygen-burning technique tends to crack and carbonize the sieves, while the residue within the pores tends to undergo various condensation reactions which plug the pores and permanently damage the sieves. In a sorption process such as that described in U.S. Pat. No. 2,985,589, the unloading of the molecular sieves from the contacting chamber would be an extremely costly and tedious operation. It is more preferable to regenerate the sieves within the contacting chamber, while simultaneously restoring the initial sorption rate and degree of selectivity in effecting the sorption of straight-chain hydrocarbons.

The process of my invention eliminates pretreating the sorbent with a dry hydrocarbon purge stream prior to displacement of the contaminants from the pores of the sorbent and the necessity of burning contaminants off of the sorbent which remain after contacting the sorbent with a hydrocarbon solvent. Additional benefits afforded through the use of a regenerant made up of water and a hydrocarbon having its molecular dimension greater than the diameter of the sorbent pore openings are that the water is allowed to displace the contaminants from the internal portions of the pores of the sorbent while the hydrocarbon is allowed to take up the contaminant by virtue of the solubility of contaminant in the particular hydrocarbon portion of the regenerant. It has been found that water displays a better ability to displace the contaminants within the pores of a molecular sieve sorbent than hydrocarbons which can enter the pores of a crystalline aluminosilicate sorbent. The hydrocarbons used in this invention, which for the most part do not enter within the pores of the sorbent, are typically aromatic hydrocarbons and can more readily dissolve contaminants on the sorbent than the normal paraffinic hydrocarbons and also can retain a greater quantity of water than the paraffinic type hydrocarbons.

SUMMARY OF THE INVENTION

I have found that solvent-water mixtures, when employed in liquid phase, are especially effective in removing the polar contaminants from deactivated molecular sieves, thereby restoring capacity and the high rates thereof, without resulting in undesirable side reactions, or in permanent damage to the sieves. In a typical separation process, the molecular sieve sorbent is used as a fixed bed and the feed stock, containing the straight-chain components to be selectively sorbed, is introduced into the bed at some point. The process may consist of two or more fixed-bed chambers, one bed processing on an adsorption cycle and the other bed on a desorption cycle; at some point later in time, the beds are switched. This is the well-known and well-defined swing-bed processing technique. Another process, continuously operated, employs a single contacting chamber, while maintaining different zones within the chamber and continuously shifts the zones by moving the points at which feed stock and desorbent are introduced, and from which raffinate and sorbate are withdrawn. This is the simulated countercurrent contacting process described and claimed in detail in U.S. Pat. No. 2,985,589.

Usually, in each of these processes, the selectively sorbed straight-chain hydrocarbon is displaced from the sieve by a desorbent straight-chain hydrocarbon, preferably of sufficiently different molecular weight to render the desorbent readily separable from the feed stock components by ordinary fractionation means. A raffinate, depleted in straight-chain hydrocarbons, and a sorbate enriched in straight-chain hydrocarbons are produced from the process, each being separately fractionated, the desorbents from each stream being combined and returned to the desorption zone. After repeated cycles of adsorption-desorption, the sieves gradually deactivate, notwithstanding extensive pretreatment of the feed stock. The sieves may be regenerated within the chamber, in accordance with the present invention, by the following procedure. A liquid, containing a mixture of water and solvent, is introduced into the bed of sieves to displace the contaminating influences from the bed. The temperature of the liquid is controlled to maintain a maximum temperature in the bed less than 150° C. Although the liquid mixture may be introduced into any point in the bed, I prefer introduction into the bottom of the bed, permitting upflow through the bed, thereby assuring complete contacting of the sieves with the liquid-phase mixture. When the liquid is introduced into the hydrocarbon-containing bed, the water will preferentially be sorbed by the zeolitic material, thereby displacing the polar contaminants. This is accompanied by the evolution of heat, resulting from the heat of adsorption. The solvent serves to carry the polar contaminants away from the sieves as well as to limit the temperature rise in the bed. The regenerant liquid is preferably a homogenous fluid such as an aromatic hydrocarbon saturated with dissolved liquid water, although a separated liquid phase hydrocarbon-water mixture may also be employed. Since the high heat of adsorption is due to the adsorption of water, the solvent fluid serves as a heat sink to prevent excess temperature rise in the bed as well as to carry the displaced polar contaminants away from the bed. The maximum temperature limitation of less than 150° C. is extremely important in view of the fact that bed temperatures much above 150° C., with water present, tends to hydrothermally injure the pore structure of the sieve, thereby causing permanent damage to the sieve.

The solvent employed is a hydrocarbon having a molecular diameter greater than the pore diameter of the pores of the aluminosilicate sorbent and typically is selected from the group of aromatics and cycloparaffins having the above molecular diameter. Although the two-phase regeneration liquids may be employed, this presents distribution, contacting the separation problems and accordingly a homogenous liquid is preferable. When using the hydrocarbon solvents, the maximum water concentration in the regeneration liquid is generally about 2.0 percent. Accordingly, when first contacting the deactivated sieves with the liquid, the temperature rise due to the heat of adsorption of water will be minimized as a result of the high concentration of hydrocarbon During the regeneration step, the temperature within the bed is maintained at a level of from about 25° to about 150° C. and preferably from 60° to 150° C.; in any event, the temperature is below about 150° C. Since the temperature rise gradient will be low when the water concentration in the liquid is low, liquid hourly space velocities (LHSV) of from 1 to 100 are suitable when the water concentration is less than 2.0 percent. As the concentration of water in the regeneration liquid increases, the initial LHSV must be decreased to avoid excessive temperature rise in the bed. Thus, when the water concentration in the regeneration liquid is 50 percent, the initial LHSV is preferably within the range of from about 0.4 to 0.8; when the water concentration is 10 percent, the initial LHSV is preferably within the range of from 2.0 to about 4.0.

In addition to acting as a heat sink and carrying away the polar contaminants, the solvent portion of the regeneration liquid appears to aid in the restoration of the selectivity that fresh sieves have for a particular normal paraffin in relation to a paraffin of a different carbon number. This may be expressed by the term B representing the selectivity of the sieve for normal paraffin No. 1 relative to a second normal paraffin No.2. Expressed in mathematical terms, B is the value calculated by the following formula when a liquid containing two normal paraffins is contacted with sieves and allowed to stand until equilibrium is achieved:

$$B_{n/x} = (C_n/C_x)_1 / (C_n/C_x)_2$$

where:

$C_n$ represents the concentration of a normal paraffin having $n$ carbon atoms per molecule;

$C_x$ represents the concentration of a normal paraffin having $x$ carbon atoms per molecule;

$(C_n/C_x)_1$ represents the concentration within the sieve pores; and, $(C_n/C_x)_2$ represents the concentration in the liquid surrounding the sieves.

The use of the solvent permits restoration of the B value of the sieves, while the water restores the sorptivity rate of the sieves. The sorptivity, or exchange rate alludes to the displacement of one normal paraffin with another, whereas the solvent, in conjunction with the water is effective in restoring the sieves original selectivity for one normal paraffin in relation to another. The rate factor can be expressed in terms of the general equation:

rate of exchange $= k$(concentration gradient) where $k$ is a constant. By comparing the $b$ and $k$ values for a deactivated or regenerated sieve to a new sieve, the extent of deactivation or regeneration can be quantitatively determined.

The regeneration liquid is continually passed, preferably upflow, through the bed of deactivated molecular sieves for a time sufficient to restore the sieves to their initial exchange rate and selectivity. This may take from 1 hour to several days, depending on the temperature within the bed during regeneration, the character of the polar contaminants on the sieves and their concentration, and the concentration of water in the regeneration liquid. It is expected that passing the regeneration liquid through the bed of deactivated sieves with benzene and water (2 percent) in liquid-phase at temperatures of 150° C. and pressures of 500 p.s.i.g. will regenerate the sieves in less than 24 hours. It is necessary that a sufficiently high pressure be used to maintain the regeneration liquid entirely in the liquid phase including allowance for pressure drop through the bed at the regeneration temperature chosen. After the regeneration liquid contacting step has been completed, the excess water is removed from the bed, and the sieves are in condition for reuse in a normal paraffin separation process. Removal of water is accomplished by drying the sieves to a predetermined low level by methods such as purging with a dry gas, or by flushing with a dry hydrocarbon fluid containing straight chain hydrocarbons.

It is thought that water, being a highly polar compound, is more tenaciously retained by the sieve than either the straight-chain components or the polar contaminants, and, accordingly, water is able to displace polar contaminants from the sieve. Sieves which have been used in a process to separate normal paraffins having from 10 to 15 carbon atoms per molecule from a kerosene feed stock until the rate and selectivity have decreased to the point where further use in the process was no longer practical, were contacted with liquid water at room temperature. The polar contaminants displaced from the sieves were analyzed by Mass Spectrometer and shown to be polynuclear compounds with an approximate molecular weight range of from 150 to about 700, and classified as being primarily polynuclear aromatics with a minor quantity of polynuclear saturates. Some of these high molecular weight compounds were found to contain nitrogen.

The following examples are included to further illustrate the regeneration method of this invention; they are not intended to limit the invention to the materials and the conditions disclosed therein.

EXAMPLES

EXAMPLE I

A batch of deactivated 30–50 mesh calcium, type A sieves which have been exposed to a kerosene charge stock for several months, in order to separate normal paraffins from their branched chain isomers and cyclic analogs, are evaluated in a dynamic test apparatus as hereafter described. A first mixture of 16 percent n-tetradecane ($C_{14}$) in isooctane is introduced into one end of a fixed bed of 40 cc. of the deactivated sieves at conditions of 300 p.s.i.g., 232° C. and 3 LHSV. When the sieve cavities are full of n-tetradecane, as evidenced by a Gas-Liquid Chromatography (GLC) analysis of the effluent from the effluent end of the fixed bed, a desorbent containing 16 percent chemically pure n-decane ($C_{10}$) in chemically pure isooctane is introduced into said one end to effect the displacement of n-tetradecane from within the sieve cavities. This is continued until the effluent contains no n-tetradecane by GLC analysis. The first mixture of $C_{14}$ is reintroduced into said one end of said bed until the effluent contains no n-decane. The slope of the concentration gradient 3 the appearance of n-tetradecane in the effluent is measured and taken as an evaluation of the rate of sorption of n-tetradecane. Specifically, during the latter n-tetradecane displacing of n-decane, it was found that 33.4 cc. of first mixture is required to be introduced into said one end for the concentration of n-tetradecane in the effluent to increase from 1.6 to 14.4 percent (these concentrations being the 10 percent point and the 90 percent point of the 16 percent concentration of n-tetradecane in the first mixture). The volume of first mixture required to change the effluent concentration from 10 to 90 percent of n-tetradecane (isooctane free basis) can be taken as a measure of the rate of sorption of n-tetradecane, and the higher the volume, the slower the rate of sorption. The breakthrough slope for the displacement of n-tetradecane ($C_{14}$) with n-decane ($C_{10}$) is also measured for the deactivated sieves and results in a value of 39.0 cc. The $k$ and $B_{14/10}$ values are calculated for the deactivated sieves and are 85 and about 1 respectively.

EXAMPLE II

Fresh 30–50 mesh calcium type A sieves are evaluated in the dynamic test apparatus described in example I. The breakthrough slope for $C_{14}$ displacing $C_{10}$ is 14.7 cc. and breakthrough slope for $C_{10}$ displacing $C_{14}$ is 59.0. The $B_{14/10}$ selectivity factor is 4.5 and the rate constant $k$ is 280. By comparing the results of examples I and II, it is apparent that the high selectivity of fresh sieves for $C_{14}$ over $C_{10}$ has been eliminated in the deactivated sieves, and the rate has decreased as a result of the deactivation.

EXAMPLE III

Another portion of the deactivated sieves of example I are regenerated by contact with a benzene-2 percent water mixture at 150° C. and 500 p.s.i.g. for 15 hours. The breakthrough slope for $C_{14}$ displacing $C_{10}$ of these regenerated sieves is 12.6 cc. and the breakthrough slope for $C_{10}$ displacing $C_{14}$ is 33.6 cc. The $B_{14/10}$ selectivity factor is 3.6 and the rate constant $k$ is 350. Comparison of these results with those of example I and II show clearly that the presence of water in the benzene has substantially reactivated the sieves to their initial selectivity and rate.

A second portion of the deactivated sieves are subjected to regeneration by contact with a benzene-2 percent water mixture at 200° C., 500 p.s.i.g. for 10 hours. These sieves were evaluated in the dynamic test apparatus and showed a breakthrough slope for $C_{14}$ displacing $C_{10}$ of 27.5 cc. Comparison with the above results shows that wet solvent regenerations using temperatures above 150° C. are not effective in regenerating the sieves. A portion of these 200° C. wet solvent regenerated sieves were contacted with air at 500° C., a procedure which will normally restore deactivated sieves substantially to their initial B and k values, and the results showed that the breakthrough slope for $C_{14}$ displacing $C_{10}$ remained high. The deactivated sieves of Example I were regenerated in air at 500° C. and the regenerated sieves had breakthrough slopes of 16.5 and 56.3, a value of 4.0 and a $k$ of 250 which is very close to the values for the fresh sieves shown in example II. Therefore, it becomes clear that the regeneration with benzene and water at temperatures of 200° C. permanently hydrothermally damaged the sieves.

EXAMPLE IV

Another portion of the deactivated sieves of example I are regenerated by contact with the liquid water at 95° C., and 400 p.s.i.g. for 15 hours. The breakthrough slope for $C_{14}$ displacing $C_{10}$ of these water regenerated sieves is 8.9 cc. and the breakthrough slope for $C_{10}$ displacing $C_{14}$ is 33.0 cc. The $B_{14/10}$ selectivity factor is 2.7 and the rate constant is 470. Comparison of these results with those of examples I through IV show that although liquid water is very effective in restoring and even improving the rate constant, it has not restored the selectivity of the sieves as much as the water-solvent regeneration procedure.

OBJECTS AND EMBODIMENTS

A principal object of the present invention involves regeneration of deactivated molecular sieves. A corollary object is to effect a substantial restoration of the sorption rate, as well as the selectivity of molecular sieves with respect to the separation of straight-chain hydrocarbons from fluid hydrocarbon mixtures by employing regeneration conditions which do not adversely effect sorbent crystalline structure.

A more specific object of the present invention is to regenerate deactivated molecular sieves within the contacting chamber in which they were utilized for the sorption of straight-chain hydrocarbons. Another, more specific object of the present invention is to displace polar organic compounds regained on the surface of a molecular sieve, utilizing a liquid solvent-water mixture.

Therefore, in one embodiment, the present invention relates to a process for regenerating crystalline aluminosilicates which have been deactivated by the retention therein, and on the crystalline surfaces thereof, of a high molecular weight, polar organic contaminant, which processes comprises contacting said aluminosilicates with a mixture of water and a solvent having larger molecular dimensions than the pores of the crystalline aluminosilicate sorbent.

Another embodiment affords an improvement in a process for separating a hydrocarbon mixture comprising a preferentially sorbable hydrocarbon and a non-sorbable hydrocarbon by alternately contacting a molecular sieve sorbent bed, capable of selectively retaining in pores of the sorbent, a straight-chain hydrocarbon of said feed mixture and of rejecting branched-chain and cyclic compounds, with said feed mixture and then with a fluid desorbent whereby said preferentially sorbable hydrocarbon is selectively retained in the pores of the sorbent during the sorption cycle and is desorbed from the sorbent during the desorbent cycles, said sorbent becoming deactivated during the aforesaid cyclic process by the retention therein, and on the crystalline surfaces thereof, of a high molecular weight polar organic contaminant of greater sorptiveness than said preferentially sorbable hydrocarbon, the method of regenerating said sorbent which comprises discontinuing the contacting of said sorbent with feed and desorbent; thereafter passing a stream of mixed liquid regenerant comprising water admixed with an organic solvent having larger molecular dimensions than the pores of the crystalline aluminosilicate sorbent, through the deactivated sorbent under conditions of temperature and pressure to maintain said regenerant stream substantially in the liquid phase; and continuing the passage of said regenerant stream through the bed until at least the major portion of the contaminants, originally present, have been removed therefrom by said mixed regenerant.

I claim as my invention:

1. A process for regenerating a crystalline aluminosilicate which has been deactivated in a hydrocarbon separation process by the retention therein of a high molecular weight polar organic contaminant, which process comprises initially preparing a mixture of water and a hydrocarbon possessing molecular dimensions larger than the diameter of the pores of said aluminosilicate, contacting said deactivated aluminosilicate with said prepared mixture at conditions of pressure and temperature selected to maintain said mixture entirely in liquid phase, said temperature not exceeding about 150° C., and the water content of said mixture ranging from a lower limit at least sufficient to displace said contaminant from the internal portions of the pores of said aluminosilicate to an upper limit of about 2 wt. percent water.

2. The process of claim 1 further characterized in that said hydrocarbon is selected from the group consisting of benzene, toluene, xylene and cyclohexane.

3. The process of claim 1 further characterized in that said crystalline aluminosilicates are Type A molecular sieves having pore entrance openings less than about 6 angstrom units.

4. In a process for separating a hydrocarbon feed mixture comprising a preferentially sorbable hydrocarbon and a non-sorbable hydrocarbon by alternately contacting a molecular sieve sorbent bed, capable of selectively retaining within the pores of the sorbent a straight chain hydrocarbon of said feed mixture and of rejecting branched-chain and cyclic compounds, with said feed mixture and then with a fluid desorbent whereby said preferentially sorbable hydrocarbon is selectively retained in the pores of the sorbent during a sorption cycle and is desorbed from the sorbent during a desorption cycle, said sorbent gradually becoming deactivated during the aforesaid cyclic process by the retention therein of a high molecular weight polar organic contaminant of greater sorptiveness than said preferentially sorbable hydrocarbon, the method of regenerating said sorbent which comprises discontinuing the contacting of said sorbent with feed and desorbent, initially preparing a substantially homogenous single phase mixed liquid regenerant comprising water and a hydrocarbon possessing molecular dimensions larger than the diameter of the pores of said sorbent, thereafter passing a stream of said mixed liquid regenerant through the deactivated sorbent under conditions of temperature and pressure to maintain said regenerant stream substantially in the liquid phase, the amount of water in said mixed liquid regenerant being at lest sufficient to displace said contaminant from the internal portions of the pores of said sorbent and not exceeding about 2 wt. percent water, said temperature being less than 150° C., continuing the passage of said regenerant stream through the sorbent bed until at least the major portion of the contaminant originally present in the adsorbent has been removed therefrom by said mixed liquid regenerant, and thereafter removing excess water from the sorbent.

5. The process of claim 4 further characterized in that said mixed liquid regenerant consists essentially of a major proportion of water and a hydrocarbon selected from the group consisting of benzene, toluene, xylene and cyclohexane.

6. The process of claim 5 further characterized in that said regenerant stream is introduced upflow into contact with the deactivated sorbent bed at a rate sufficiently low to maintain a maximum temperature in the bed below about 150° C.

7. The process of claim 6 further characterized in that said temperature in the bed is maintained at a level within the range of from about 60° to about 150° C. during the entire time when the liquid regenerant is passing through the bed.

8. The process of claim 7 further characterized in that the sorbent is a metallic aluminosilicate containing pore entrances of from about 4 to about 6 angstrom units in cross-sectional diameter.

9. The process of claim 8 further characterized in that the sorbent is a Type A calcium aluminosilicate molecular sieve.

* * * * *